Oct. 20, 1970  E. H. FINK ET AL  3,534,645
TUBE CUTTING APPARATUS
Filed Aug. 12, 1968  3 Sheets-Sheet 1
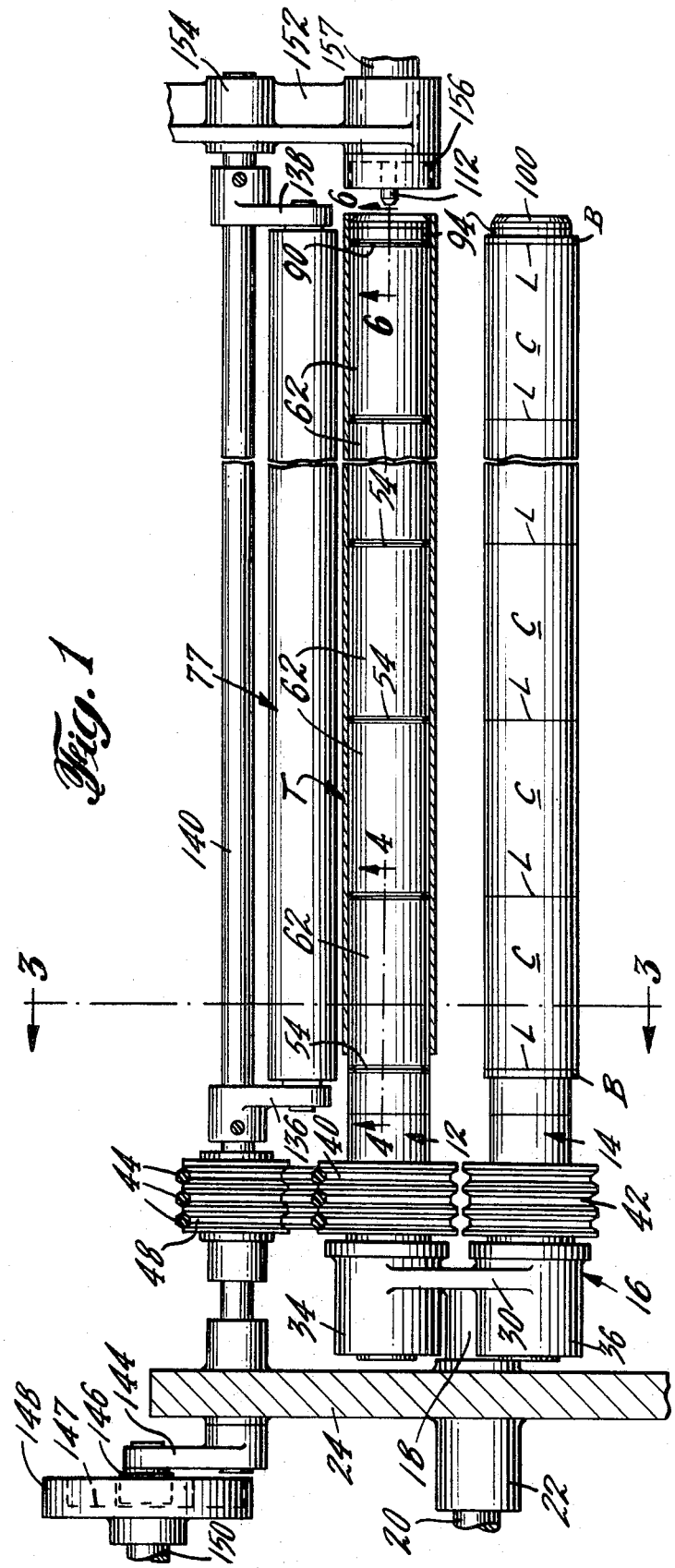
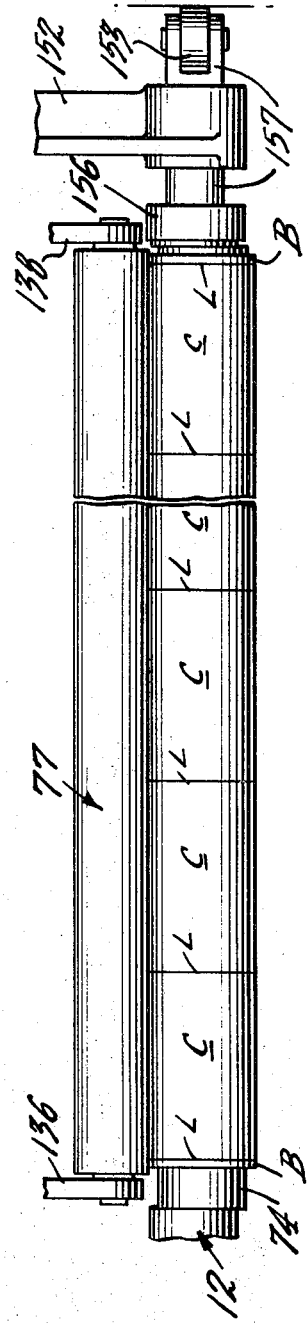
INVENTORS
EDWIN HAROLD FINK
ROBERT DARRYL HOGUE
BY
Frank J. Jordan
ATTORNEY Oct. 20, 1970 E. H. FINK ET AL 3,534,645
TUBE CUTTING APPARATUS
Filed Aug. 12, 1968 3 Sheets-Sheet 2
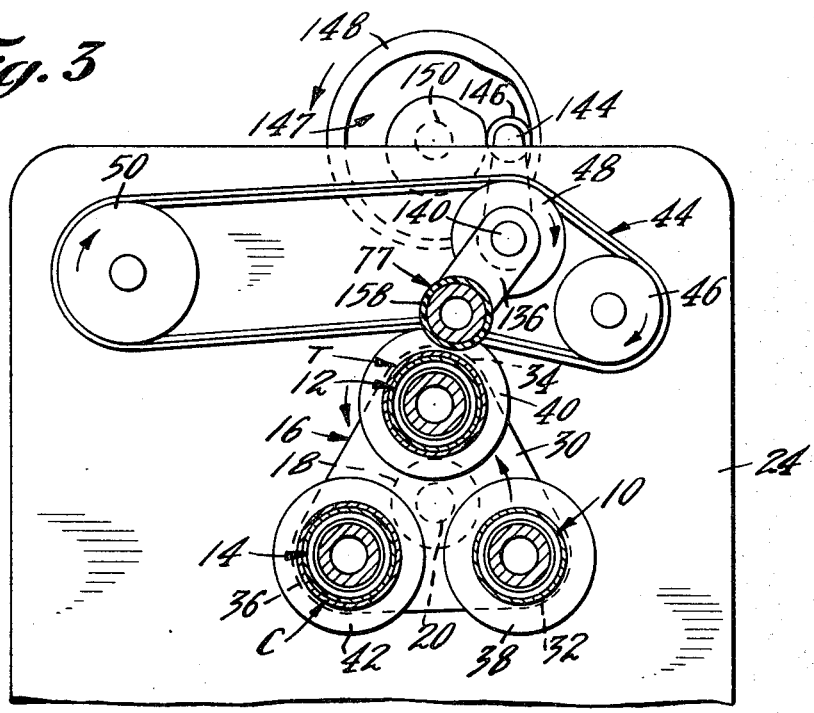
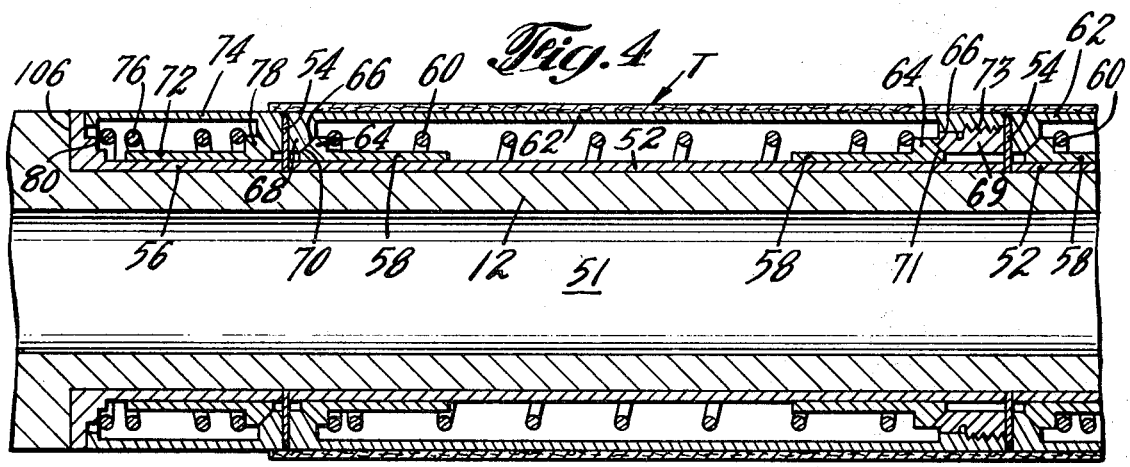
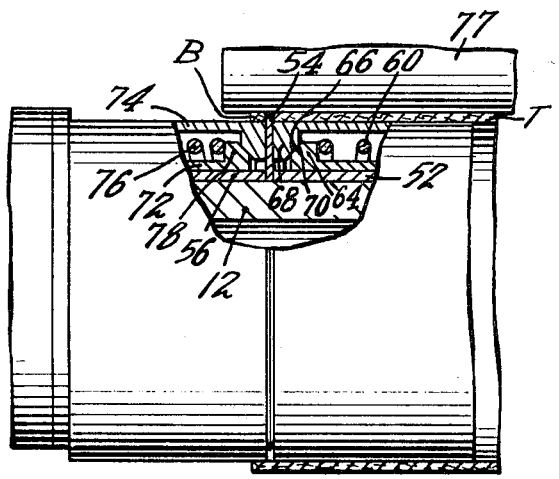
INVENTORS
EDWIN HAROLD FINK
ROBERT DARRYL HOGUE
BY
Frank J. Jordan
ATTORNEY Oct. 20, 1970  E. H. FINK ET AL  3,534,645
TUBE CUTTING APPARATUS Filed Aug. 12, 1968

INVENTORS
EDWIN HAROLD FINK
ROBERT DARRYL HOGUE
BY
Frank J. Jordan
ATTORNEY

United States Patent Office 3,534,645
Patented Oct. 20, 1970

3,534,645
TUBE CUTTING APPARATUS
Edwin Harold Fink, Wilton, Conn., and Robert Darryl Hogue, Cocoa Beach, Fla., assignors to American Can Company, New York, N.Y., a corporation of New Jersey
Filed Aug. 12, 1968, Ser. No. 752,032
Int. Cl. B23b 3/04
U.S. Cl. 82—82          14 Claims

ABSTRACT OF THE DISCLOSURE

In an apparatus for cutting tube sections into container body lengths, a mandrel shaft on which a tube section to be cut is received fixedly mounts a circular cutting knife in concentric relationship therewith. A sleeve adjacent said cutting knife is mounted on the mandrel shaft for movement between concentric and eccentric positions. A backup roller is adaptable to engage a tube section received on the sleeve to shift the tube section and sleeve from a normally concentric position to an eccentric position thereby exposing the concentric cutting knife to cut the tube section from the inside out as the mandrel shaft is rotated.

BACKGROUND OF THE INVENTION

In the art of manufacturing containers, it is well-known to form elongated, prelabeled tubes from which individual container bodies are derived. These elongated tubes may be formed in a well-known manner by helically winding onto a suitable mandrel a plurality of ribbons of sheet material made of paper, plastic, foil, or the like, with the successive layers of helically wound ribbons of sheet material having either butt joints or overlapping joints between their convolutions. The layers are superimposed upon each other with suitable adhesives therebetween and with the joints between the successive convolutions of one layer out of alignment with those of the next layer so that in this way it is possible to build up a rigid tubular structure. The tubes are formed in this way in practically endless lengths inasmuch as the ribbons of sheet material which are helically wound are derived from large supply rolls from which the ribbons are continuously fed onto the mandrel in a manner well-known in the art. For convenience in handling, it is customary in the art to cut the elongated tubes which are formed on the mandrel into tube sections, sometimes referred to as sticks, which contain a predetermined number of potential individual container bodies. Subsequently these tube sections are subdivided in order to form the individual container bodies which are thereafter filled and closed in a well-known manner at their ends in order to form final, sealed containers.

In order to provide for the various manufacturing variables which are normally encountered, each tube section or stick has a length equal to a multiple of the length of the ultimate tubular container body plus a relatively small excess length at both longitudinal ends, said excess lengths being removed as trim bands when the tube section is cut into individual container bodies. In some cases, there is an additional relatively small excess length or trim band at one or more intermediate longitudinal positions of the tube section. These trim bands are also, removed or cut out when the tube section is cut into individual container bodies.

According to present known practices, container bodies are cut by circular knives brought into contact with the rotating tube, cutting from the outside in. The tube is placed on an effectively solid mandrel with hardened rings for the circular knives to cut against. The cutting knives produce a wedging effect which tend to result in fracturing of the innermost layer or protective liner of the tube. In addition, the wedging effect generally results in "turn-in" of the container body material at the longitudinal ends thereof causing reduced diameters at the ends of the container bodies. Slight deflection, misalignment of the knife settings, knife dulling, and the fracturing noted above generally results in fragments of particles at the exit of the cut. Upon removal of the recut bodies from the mandrel, these particles collect on the inside of the container body as foreign particles which must be removed.

According to the present invention, the tubes are cut from the inside out. Circular cutting knives are fitted onto the main support shaft of the recutting mandrel between recutter sections which can be moved eccentrically relative to the main support shaft. A backup roller is brought into contact with the tube to move the latter and the movable recutter sections into an eccentric position, relative to the main support shaft, thus exposing the cutting knives to cut the tube from the inside out.

The wedging effect of the knife as it cuts from the inside out causes the innermost layer or protective liner at the container body ends to be outwardly turned to produce a "turn-out" and to be formed into a smooth radius providing for continuity of the sealing and protective layer of the inside surface of the container body. The slight "turn-out" at the edges of the body ends permit the closing ends to be inserted and sealed without disturbance of the continuity of the inside protective layer. Fractures occurring at the exit edge with inside-out recutting do not impair the continuity of the inside protective layer, and any loose particles can be readily removed from the external surfaces of the container.

SUMMARY OF THE INVENTION

In an apparatus for cutting tube sections into container body lengths, a rotatable mandrel shaft on which a tube section to be cut is received fixedly mounts a circular cutting knife in concentric relationship therewith. A sleeve having an outside diameter at least as large as the diameter of said cutting knife is carried on said mandrel shaft adjacent to said cutting knife and is adaptable to receive thereover a tube section to be cut. The sleeve is mounted on said mandrel shaft for movement between concentric and eccentric positions relative to the mandrel shaft. External backup means such as a roller is moveably mounted relative to said mandrel shaft between inoperable and operable positions. Upon being moved from an inoperable to an operable position, the backup roller engages a tube section carried on the sleeve and shifts the tube section along with the sleeve from a normally concentric position to an eccentric position thereby causing the concentric circular cutting knives to be exposed to cut the tube section from the inside out as the mandrel shaft is rotated. A plurality of longitudinally spaced cutting knives and moveably mounted sleeves may be provided to simultaneously cut a plurality of container bodies from the inside out in the same manner.

BRIEF DESCRIPTION OF THE DRAWINGS

FIG. 1 is an elevational view, parts of which are broken away and shown in section, of apparatus for cutting tubes from the inside out according to one embodiment of the invention.

FIG. 2 is an elevational view of a portion of the apparatus shown in FIG. 1 with the parts shown in a different operating position.

FIG. 3 is a transverse section taken substantially along line 3—3 of FIG. 1 looking in the direction of the arrows.

FIG. 4 is a longitudinal section taken substantially along line 4—4 of FIG. 1.

FIG. 5 is a fragmentary, longitudinal section showing a portion of the parts shown in FIG. 4 but a different operating position.

DESCRIPTION OF THE PREFERRED EMBODIMENTS

Figure 6:
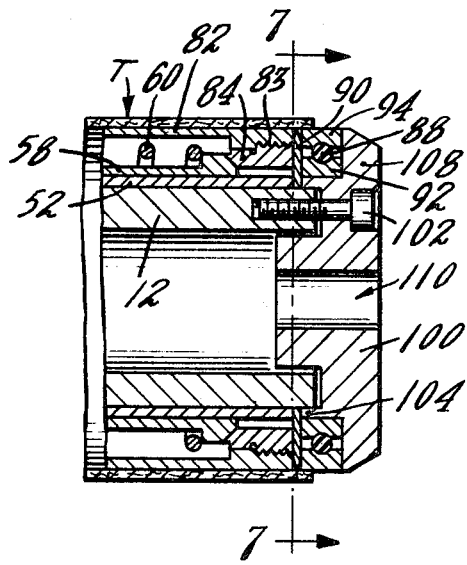
FIG. 6 is a longitudinal section taken substantially along line 6—6 of FIG. 1.

As has been indicated heretofore, the structure which will eventually form the tube from which the container bodies are to be cut is initially in the form of layers of windings of suitable material superimposed on and adhering one to the other. This tube is made on a suitable winding mandrel (not shown) by known means. For convenience in handling, the tube which is continuously formed in this manner is cut into tube sections or sticks T each of which is to be subdivided into a plurality of individual container bodies by the apparatus described herein. Each of the tube sections T comprises a predetermined number of labeled container bodies C and end trim bands B separated by lines of potential severance L.

As can best be seen in FIG. 3 three mandrels 10, 12, 14 are mounted 120° apart on a rotatable turret 16. The turret 16 is provided with a hub 18 about which the mandrels 10, 12, 14 are adapted to be indexed or rotated to pass through three operating stations. In FIG. 3, the mandrel 10 is in the loading station, mandrel 12 is in the cutting station, and mandrel 14 is in the discharge station.

The hub 18 is keyed to a central shaft 20 which in turn is rotatably mounted within a bearing support 22 (FIG. 1) rigidly mounted on a supporting frame 24. The shaft 20 is intermittently rotated, as by a Maltese-cross or Geneva drive (not shown) for example, so as to periodically turn the shaft 20 and turret 16 through angles of 120°. The rotary movement of the turret member 16 is synchronized with the reciprocation of a pusher plate (not shown) in any suitable manner so that as the mandrels 10, 12, 14 are successively moved into the loading station into predetermined alignment with a feed trough (not shown), the pusher plate situated at the loading station will advance a tube section T longitudinally onto the particular mandrel 10, 12, 14 which is situated in the loading station.

The turret 16 comprises the hub 18, previously described, a web 30 fixed to the hub 16, and three bearing assemblies 32, 34, and 36 supported by and fixed to the web 30. Each bearing assembly 32, 34, 36 has a central bore in which end portions of the mandrels 10, 12 and 14 respectively, are rotatably supported. Each mandrel 10, 12, 14 fixedly mounts a pulley 38, 40 and 42 respectively, each of which is adapted to be engaged and rotated by belts 44 when the particular mandrel is in the cutting station. The belts 44 are continuously driven and are guided about pulleys 46, 48, and 50, one of which may be driven in any suitable manner. As each mandrel 10, 12, or 14 comes into the cutting station, the pulley 38, 40 or 42 which is mounted therewith comes into engagement with the constantly driven belts 44 so that whenever a mandrel is at the cutting station, it will be rotated together with the tube section T which it carries. As best shown in FIG. 3, each pulley 38, 40, 42, as it is indexed into the cutting station, passes beyond the line of tangency extending between pulleys 46 and 50 so that the belts 44, in passing from pulley 46 to pulley 50, will engage and rotate the particular pulley 38, 40, or 42 which is situated in the cutting station.

As can best be seen in FIG. 4, the mandrel 12 which may have a bore 51 therein as shown, mounts a plurality of cylindrical spacers 52. These spacers 52 serve to rigidly mount and support a plurality of circular cutting knives 54 each of which has a central opening adapting each knife to be received on the mandrel 12 as shown in FIG. 4. As can best be seen in FIG. 4, the longitudinal ends of the cylindrical spacers 52 abut and support the circular cutting knives 54 so that the mandrel 12, the spacers 52, and the cutting knives 54 define a unified, rotatable structure concentric to the centerline of the mandrel 12. The longitudinal lengths of the spacers 52 are substatnially equal to the longitudinal length of a container body C whereby the spacers 52 locate the cutting knives 54 in the desired position to cut the tubular section T into container body lengths C. An end spacer 56 (FIG. 4) is fitted at the turret end of the mandrel 12 to establish the position of and support the end cutting knife which will cut off the trim band B at one longitudinal end of the tubular section T.

Mounted for longitudinal sliding movement on either side of the right hand cutting knife 54 in FIG. 4 are two cylindrical slides 58. These slides 58 fit loosely on the spacers 52 and are freely slidable thereon in an axial direction. The slides 58 are urged towards the adjacent cutting knife 54 by spring means in the form of coil springs 60 which encircle the mandrel shaft 12.

Disposed radially outwardly of the slides 58 are a plurality of cylindrical sleeves 62 which define the outer surface of the mandrel 12. A mandrel sleeve 62 is located between the two circular knives 54 shown in FIG. 4 and is substantially equal in length to the longitudinal length of the container bodies C to be cut from the tube section T.

Each slide 58 has an outer flange 64 at one longitudinal end and each such flange 64 has a frusto-conical surface 66 generally facing the adjacent cutting knife 54. Similarly, each mandrel sleeve 62 has two inner flanges 68 and 69 each provided with a frusto-conical surface 70 and 71 respectively, which are adapted to mate and provide sliding contact with the frusto-conical surfaces 66 on and associated mandrel slide 58. One of the two inner flanges on the mandrel sleeve 12 (in the illustrated embodiment, inner flange 69) is detachably affixed as by the threads 73, to the mandrel sleeve 62 to facilitate assembly in that initial detachment of the inner flange 69 readily permits placement of the slides 58 and spring 60 into the assembled position shown in FIG. 4.

As in the case of the end spacer 56, an end slide 72 and an end sleeve 74 are provided on the turret end of the mandrel 12 and a spring means in the form of a coil spring 76 disposed around the end slide 72 has one end abutting an outer flange 78 on the end slide 72 and the other end abutting a shoulder 80 on the end spacer 56.

From the above description it will be apparent that the plurality of coil springs 60 and the end spring 76, all initially installed under compression, tend to urge the plurality of slide members 58 and the end slide 72 towards the cutting knives 54 with which they are associated. With each of the plurality of slide members 58 and the end slide 72 biased in the aforesaid position closest to the associated cutting knife 54, the mandrel sleeves 62 and end sleeve 74 assume a position concentric with the centerline of the mandrel 12, as shown in FIG. 4. This is so because the frusto-conical surfaces 66 on the plurality of slides 58 engage the frusto-conical surfaces 70 and 71 on the plurality of sleeves 62 to urge and move the latter in a longitudinal direction until centered relative to the longitudinal axis of the mandrel 12. Similarly, the frusto-conical surface on end slide 72 engages the frusto-conical surface on the end sleeve 74 to center the end sleeve 74.

It will be seen that both cutting knives 54 shown in FIG. 4 have associated therewith a pair of slides 58, 58 and 72, 58 and a plurality of intermediate sleeves 62 and an end sleeve 74 whereby all the sleeves are normally urged and held in a position concentric to the centerline of the mandrel shaft 12. The outer diameter of the circular knives 54 is just equal to or slightly less than the outer diameter of the mandrel sleeves 62 and 74. Accordingly, when the mandrel sleeves 62, 74 are in a concentric position (FIG. 4) the outer peripheral edge of the cutting knives 54 will be disposed between two adjacent sleeves and will not protrude beyond the circumference of the sleeves 62, 74 or otherwise interfere as a tubular section T is slid longitudinally onto or off of the mandrel 12. However, as will be described in greater detail hereinafter, once a tubular section T is slid into position on the mandrel and the latter is indexed to the cutting station 12, a backup roll 77 having a length substantially equal to or just slightly greater than the length of the tube section T and mounted with its longitudinal axis parallel to that of the mandrel, is moved laterally of its longitudinal axis to engage the tube section T to urge the latter in a lateral direction. As this occurs, mandrel sleeves 62, 74 are shifted laterally into an eccentric position (FIG. 5) thereby exposing the cutting knives 54 which remain in their fixed concentric position so that the latter cuts the tubular section T along the lines of severance L as the mandrel is rotated.

Turning now to a description of the parts used for trimming the other end of the tube section T, it will be seen in FIG. 6 that the free end of the mandrel 12 carries a sleeve 82 having an inner flange 84 which is detachably affixed to the mandrel sleeve 82 by the threads 83. The end of the mandrel 12 also carries a circular cutting knife 90 adjacent the end of the sleeve 82. An annular end support ring 94 is located on the end portion of the mandrel adjacent the cutting knife 90 as will be further described.

Figure 8:
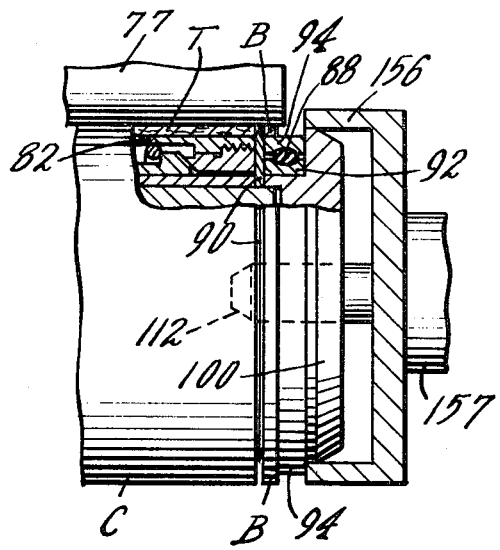
FIG. 8 is a fragmentary, longitudinal view showing a portion of the parts shown in FIG. 6 but in a different operating position.
Figure 9:
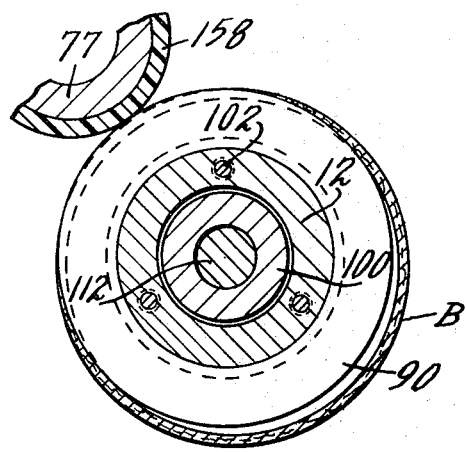
FIG. 9 is a sectional view similar to FIG. 7 but showing the parts in a different operating position.

It will be seen in FIG. 6 that an end cap 100 is affixed to the end of the mandrel 12 by a plurality of threaded fasteners 102. The end cap 100 has a collar 104 which fits over the end of the mandrel 12 to abut the circular knife 90. The end cap 100 serves to apply a longitudinal force on all the spacers 52, 56 and knives 54, 90 to secure the aforesaid between said end cap 100 and a shoulder 106 (FIG. 4) on the turret end of the mandrel 12. The end cap 100 is also provided with a flange portion 108 disposed on one side of the previously mentioned end ring 94. The flange portion 108 is spaced from the knife 90 as to provide a loose fit for the end ring 94 therebetween so that the latter is free for translatory movement as will be described. The end support ring 94 is supported in a normally concentric position relative to the mandrel shaft 12, as shown in FIG. 6, by resilient means which in the illustrated embodiment is in the form of a rubber O-ring 88. The O-ring 88 is disposed in an annular space between the end support ring 94 and an inner ring 92 mounted on the collar 104 of the end cap 100. When the tube section T and all the intermediate sleeves 62 and end sleeves 74 and 82 are moved into an eccentric position (FIG. 8) by the backup roll 77 to effect the cutting operation, as previously mentioned, the end ring 94 will likewise be moved into the same eccentric position. Thus, the end portion of the backup roll 77 will engage the trim band B of the tube section to force said trim band B against the end ring 94 and thereby displace the latter into the aforesaid eccentric position as shown in FIG. 8. Accordingly, the trim band B of the tube T is continuously supported by the end ring 94 during the cutting operation. When the backup roll 77 is returned to its inoperative position (FIG. 1), the end ring 94 is recentered or returned to its concentric position (FIG. 6) by virtue of the resiliency of the annular member 88.

A central bore 110 in the end cap 100 is adapted to receive a support pin 112 (FIGS. 1 and 8), to be further described, to rotatably support the end of the mandrel 12 when the latter is rotated in the cutting station.

Figure 7:
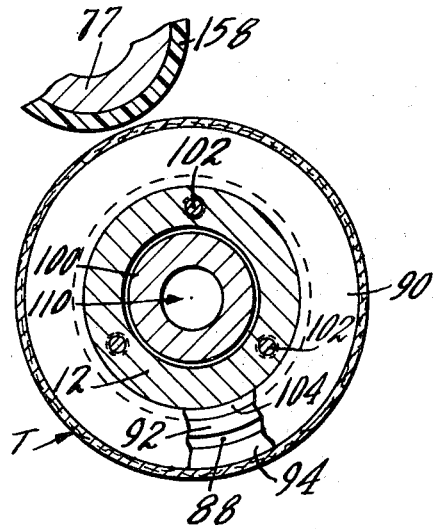
FIG. 7 is a transverse section taken substantially along line 7—7 of FIG. 6.

The previously mentioned backup roll 77 is supported by and mounted for rotation in bearings carried in support brackets 136 and 138. The support brackets 136, 138 are adapted to be pivoted by means of a shaft 140 to which the brackets 136, 138 are suitably secured. The shaft 140 is mounted for rotation within a bearing in the previously described frame member 24 and in a bearing 154 mounted in a frame member 152 at the opposite end thereof. As the shaft 140 is rotated, by means to be described, the backup roll 77 will be pivoted between operable and inoperable positions. In the operable position as shown in FIGS. 1 and 7 for example, the backup roll 77 is spaced from the tube section T on the mandrel in the cutting station so that successive mandrels may be indexed into and out of cutting station without interference from the backup roll 77. In pivoting from the inoperable to the operable position, the latter position being shown in FIGS. 2 and 8 for example, the backup roll 77 engages the tube section T, exerts a lateral force thereagainst and forces the mandrel sleeves into the previously mentioned eccentric disposition, thereby exposing the cutting knives and effecting the cutting of the tube section as the mandrel 12 is rotated as previously described.

The shaft 140 may be provided with a bearing to rotatably support the pulley 48 about which the previously described belts 44 pass. The pulley 48 is freely rotatable on the shaft 140.

One end of the shaft 140 fixedly carries a lever 144 which supports for relative rotation at its free end, a cam follower roller 146. The cam follower roller 146 is received in and engages the side walls of an endless groove 147 in a cam plate 148, as best shown in FIGS. 1 and 3. The cam plate 148 is fixed on a shaft 150 which is rotated by any suitable drive means (not shown) at such a speed that the cam plate 148 will turn through one revolution for each operating cycle.

In making one revolution, the cam plate 148 is operable to pivot the backup roll 77 between the inoperative and operative positions previously described. More specifically, the cam groove 147 varies in its distance from the center line of the cam plate 148 so that as the cam plate 148 rotates, the follower roller 146 follows the contour of the groove 147 to thereby pivot the lever 144 about the center line of the shaft 140. Since the lever 144 is fixed to shaft 140, the latter also pivots to thereby pivot the levers 136, 138 on which the backup roll 77 is carried. It will be apparent, therefore, that the contour of the groove 147 in cam plate 148 determines the character of the pivotal movement of the backup roll 77. Thus the cam groove 147 may be designed to move the backup roll 77 into contact with the tube section T at a relatively quick rate and then to continue to move the backup roll 77 at a slower rate so that the backup roll 77 is fed gradually against the tube section T. The arrangement may be such that the eccentric position of the mandrel sleeves necessary to effect a complete cut through the tube section T may not be reached until the mandrel has made several revolutions. Expressed otherwise, the tube section T may make several revolutions from the time of initial contact of the cutters with the tube section until the latter is completely cut all the way through. Of course, when mandrel 12 reaches the cutting station, its pulley 40 will have come into engagement with the drive belts 44 so that the mandrel 12 with the tube section thereon continuously rotates while in the cutting station.

The cam 148, after pivoting the backup roll 77 to effect the cutting operation as aforesaid and, as desired, permitting a dwell of the backup roll 77 in its maximum or near maximum operative pivotal position during several revolutions of the tube section, is then operable to return the backup roll 77 to its inoperative position whereby the mandrel sleeves 62, 74 and end support ring 94 are recentered and the backup roll 77 is free and clear of the recentered and cut tube section. This, of course, permits the machine to be indexed whereby the turret 18 is rotated 120° and the mandrel having the cut tube section T thereon is placed in the discharge station where the container bodies C and the trim bands B may be stripped longitudinally off of the mandrel by means known (not shown). Of course, when the machine is indexed as aforesaid, a new uncut tube section, which was previously slid onto the mandrel in the cutting station, is moved into the cutting station whereby the cycle of operation is ready to be repeated.

It will, of course, be understood that although only the mandrel 12 has been described in detail, that the other two mandrels 14 and 16 are similarly constructed so that all three mandrels function in the same manner as they are indexed through the three operating stations. Similarly, although only one sleeve 62 and only one mounting means therefore has been described in detail, the remaining sleeves 62 and their mounting means are of a similar construction.

In order to support the end of each mandrel 10, 12, or 14 as it resides in the cutting station, a longitudinally slidable member 157 mounting the previously mentioned support pin 112 is provided. A cam follower 153 (FIG. 2) on the member 157 is operable to engage a cam (not shown) to slide the member 157 longitudinally relative to the frame 152 between operative and withdrawn positions. In the withdrawn position (FIG. 1), the member 157 and its pin 112 are free and clear of the longitudinal end of the mandrels thereby permitting the latter to be indexed into and out of the cutting station. Afer the mandrel is indexed into the cutting station, the cam (not shown) for actuating the member 157 slides the latter longitudinally into operative position (FIG. 2) whereby the support pin 112 slides into the opening 110 on end cap 100 to form a support for the end of the mandrel as the backup roll 77 is moved between its inoperative and operative positions. After the tube section is cut, the member 157 is returned to its withdrawn position (FIG. 1). The member 157 may be biased by a spring (not shown) into its withdrawn (FIG. 1) position and the cam (not shown) for actuating the member 157 arranged to permit the said spring to return the member 157 to said withdrawn position.

The member 157 may be provided with a cylindrical portion or cup 156 having an inner diameter substantially equal to the outer diameter of the mandrel. When the member 157 is slid from its withdrawn to its operative position, the cup 156 will pass over the end of the mandrel to engage and slide the end of the tube section into position on the mandrel. Of course, if the tube section T is already positioned in the desired longitudinal location on the mandrel at the loading station, the cup 156 will not affect the positioning of the tube section on the mandrel at the cutting station. The cam (not shown) which moves the member 157 into operative position may be operable to allow the member 157 and its cup 156 to slide slightly to the right (as shown in FIG. 8) out of the way of the backup roll 77 after the tube section T has been positioned by the cup 156.

The backup roll may have a covering or outer layer of resilient material (e.g. urethane having a 90 to 95 Durometer) 158 into which the cutting knives may penetrate slightly during the cutting operation.

Use of a resilient material on the backup roll 77 will insure a long life to the cutting edges of the cutting knives. The faces of the cutting knife which define the cutting edge may be contoured (e.g. they may be slightly arcuate) thereby to determine the contour of the "turn out" at the longitudinal ends of the cut container bodies.

It is thought that the invention and many of its attendant advantages will be understood from the foregoing description and it will be apparent that various changes may be made in the form, construction, and arrangement of the parts without departing from the spirit and scope of the invention or sacrificing all of its material advantages, the form hereinbefore described being merely a preferred embodiment thereof.

We claim:
1. Apparatus for cutting tube sections from the inside out comprising;
   a mandrel shaft,
   means for rotating said mandrel shaft,
   a circular cutting knife fixed to said shaft,
   a sleeve carried on said mandrel shaft adjacent to said cutting knife and adaptable to receive thereover a tube section to be cut,
   said sleeve having an outside diameter at least as large as the diameter of said cutting knife,
   means mounting said sleeve on said mandrel shaft for movement between concentric and eccentric positions relative to said mandrel shaft,
   a backup means movably mounted relative to said mandrel shaft between inoperable and operable position,
   said backup means in being moved from an inoperable to an operable position engaging a tube section on said sleeve, and shifting the latter along with said tube section from a normally concentric position to an eccentric position causing the circular cutting knife to projet radially outwardly of said sleeve and thereby cut the tube section from the inside out as said mandrel shaft is rotated.

2. Apparatus for cutting tube sections according to claim 1 wherein said means for mounting said sleeve on said mandrel shaft comprises:
   a slide member associated with said cutting knife and longitudinally slidable on said mandrel shaft,
   biasing means urging said slide member in one longitudinal direction,
   and cam means on said slide member and said sleeve operable to convert said longitudinal biasing force on said slide member to a radial biasing force on said sleeve.

3. Apparatus for cutting tube sections according to claim 2 wherein said slide member comprises:
   a cylindrical collar having an external flange,
   said flange defining in part a frusto-conical surface,
   said sleeve having an internal flange defining in part a frusto-conical surface which is adapted to mate with the frusto-conical surface on said external flange thereby to define said cam means.

4. Apparatus for cutting tube sections according to claim 3 wherein means are provided to detachably connect said internal flange to said sleeve.

5. Apparatus for cutting tube sections according to claim 1 wherein there are a plurality of longitudinally spaced cutting knives on said mandrel shaft, each having a central opening in which said mandrel shaft is received, and,
   a plurality of cylindrical spacers on said mandrel shaft positioning and securing said cutting knives in desired positions on said mandrel shaft.

6. Apparatus for cutting tube sections according to claim 5, further comprising:
   an end cap,
   means fastening said end cap to the mandrel shaft to secure said cutting knives and said spacers in a fixed position on said mandrel shaft.

7. Apparatus for cutting tube sections according to claim 1 wherein said mandrel shaft has a foreshortened sleeve adjacent to and associated with said cutting knife,
   an end slide member associated with said foreshortened sleeve,
   biasing means normally urging said end slide member towards said end cutting knife, and
   cam means utilizing said biasing force to normally bias said foreshortened sleeve in a concentric position.

8. Apparatus for cutting tube sections according to claim 1 further comprising:
   a foreshortened support ring on said mandrel shaft adjacent said cutting knife, and biasing means normally urging said support ring in a concentric position.

9. Apparatus for cutting tube sections according to claim 8 wherein said biasing means comprises: a resilient annular member disposed between the support ring and the mandrel shaft.

10. Apparatus for cutting tube sections according to claim 1 wherein said backup means comprises: a roller having a longitudinal length at least as long as the longitudinal length of the tube section to be cut.

11. Apparatus for cutting tube sections according to claim 1 wherein said backup means comprises: a roller having an outer surface formed of a resilient material.

12. Apparatus for cutting tube sections according to claim 1 wherein said backup means comprises:
a roller,
means for mounting said roller for movement between an inoperable position wherein the roller is spaced from a tube section carried on said mandrel and an operable position wherein the roller tangentially engages the tube section on said mandrel and shifts said tube section, along with the mandrel sleeve on which the tube section is carried, from a concentric to an eccentric position, thereby exposing said cutting knives to said tube section to cut the latter from the inside out.

13. Apparatus for cutting tube sections according to claim 12 further comprising:
cam means for moving said backup roller between inoperable and operable positions,
said cam means comprising a cam element operable to progressively move said tube section and mandrel sleeve from the aforesaid concentric to said eccentric position during several revolutions of the mandrel shaft so that the tube section is progressively cut from the inside out during said several rotations of the mandrel shaft.

14. Apparatus for cutting tube sections according to claim 12 further comprising means for supporting the free end of the mandrel shafts as the latter is rotated during the cutting operation.

References Cited
UNITED STATES PATENTS

| | | | |
|---|---|---|---|
| 2,298,366 | 10/1942 | Gladfelter | 82—101 X |
| 2,701,015 | 2/1955 | Gottschalk | 82—102 |
| 3,359,841 | 12/1967 | Cuacho et al. | 82—82 |
| 3,400,620 | 9/1968 | Armbruster et al. | 82—82 |

HARRISON L. HINSON, Primary Examiner

U.S. Cl. X.R.

82—101